(12) United States Patent
Wu et al.

(10) Patent No.: US 10,645,780 B2
(45) Date of Patent: May 5, 2020

(54) CONTROL CIRCUIT AND CONTROL METHOD FOR LIGHTING CIRCUIT, AND LIGHTING CIRCUIT

(71) Applicant: Joulwatt Technology (Hangzhou) Co., Ltd., Hangzhou (CN)

(72) Inventors: Zhongwu Wu, Hangzhou (CN); Hao Long, Hangzhou (CN); Yingyan He, Hangzhou (CN); Yuancheng Ren, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 16/406,676

(22) Filed: May 8, 2019

(65) Prior Publication Data

US 2019/0350055 A1    Nov. 14, 2019

(30) Foreign Application Priority Data

May 8, 2018    (CN) .......................... 2018 1 0433737

(51) Int. Cl.
| | |
|---|---|
| *H05B 37/02* | (2006.01) |
| *H05B 45/37* | (2020.01) |
| *H05B 45/44* | (2020.01) |
| *H05B 45/50* | (2020.01) |
| *H05B 33/08* | (2020.01) |
| *H05B 45/10* | (2020.01) |

(52) U.S. Cl.
CPC ............. *H05B 45/37* (2020.01); *H05B 33/08* (2013.01); *H05B 45/10* (2020.01); *H05B 45/44* (2020.01); *H05B 45/50* (2020.01)

(58) Field of Classification Search
CPC ............ H05B 33/0845; H05B 33/0815; H05B 33/0884; H05B 33/08; H05B 45/10
USPC .............................................. 315/185 R, 291
See application file for complete search history.

(56) References Cited

U.S. PATENT DOCUMENTS

| | | | |
|---|---|---|---|
| 2010/0308738 A1* | 12/2010 | Shteynberg | ........ H05B 33/0812 |
| | | | 315/185 R |
| 2016/0150607 A1* | 5/2016 | Kim | ................... H05B 33/0815 |
| | | | 315/210 |
| 2018/0014369 A1* | 1/2018 | Kim | ................... H05B 33/0812 |

* cited by examiner

*Primary Examiner* — Thuy V Tran
(74) *Attorney, Agent, or Firm* — Treasure IP Group, LLC

(57) ABSTRACT

Disclosed a control circuit for a lighting circuit. In the control circuit, an AC input signal provided at an AC input terminal is rectified to obtain a rectified voltage, a low potential end of the rectified voltage is used as a reference ground, a load of the lighting circuit is composed of N strings connected in series, and N is a natural number greater than or equal to 2, when the control circuit detects that the AC input terminal is connected to a dimmer, the control circuit controls the N strings to be simultaneously turned on, when the control circuit detects that the AC input terminal is not connected to the dimmer, the control circuit controls the N strings to be individually turned on in accordance with the rectified voltage. According to the present disclosure, the lighting circuit can obtain a high power factor and is compatible with the dimmer, and the scheme is simple and easy to implement.

10 Claims, 7 Drawing Sheets

US 10,645,780 B2

CONTROL CIRCUIT AND CONTROL METHOD FOR LIGHTING CIRCUIT, AND LIGHTING CIRCUIT

CROSS-REFERENCE TO RELATED APPLICATION

This application claims the benefit of Chinese Patent Application No. 201810433737.0, filed on May 8, 2018, entitled as 'control circuit and control method for lighting circuit, and lighting circuit', which is incorporated herein by reference in its entirety.

BACKGROUND OF THE DISCLOSURE

Field of the Disclosure

The present disclosure relates to the technical field of power electronics, and in particular, to a control circuit and a control method for a lighting circuit, and a lighting circuit.

Description of the Related Art

LED lamps are gradually replacing existing fluorescent and incandescent lamps because they are more energy-efficient and environmentally friendly than traditional fluorescent and incandescent lamps. For incandescent lamps controlled by dimmers, it is also desirable to replace them with the LED lamps, so the LED lamps are required to be compatible with the dimmers. A linear LED driving circuit is widely used because of its simple implementation and low cost. However, due to inherent characteristic of constant current conduction mode used by the linear LED driving circuit, currently, mainstream market products of a linear dimming system have low power factors, which generates a large amount of harmonic pollution to power grid, reduces the quality of the power grid, and causes interferences to other electrical equipment. Therefore, how to make the linear LED driving circuit compatible with the dimmer and achieve a high power factor is an urgent problem to be solved at present.

SUMMARY OF THE INVENTION

In view of this, an object of the present disclosure is to provide a control circuit and a control method for a lighting circuit, and a lighting circuit, in order to solve the problem that the linear driving circuit has a low power factor and is incompatible with the dimmer in the prior art.

According to a first aspect of the present disclosure, there is provided a control circuit for a lighting circuit, wherein an AC input signal provided by an AC input terminal is rectified to obtain a rectified voltage between a high potential end and a low potential end, the low potential end of the rectified voltage is used as a reference ground, a load of the lighting circuit is composed of first to $N^{th}$ light strings connected in series, and N is a natural number greater than or equal to 2, when the control circuit detects that the AC input terminal is connected to a dimmer, the control circuit controls the first to $N^{th}$ light strings to be simultaneously turned on, when the control circuit detects that the AC input terminal is not connected to the dimmer, the control circuit individually controls the first to $N^{th}$ light strings to be turned on in accordance with the rectified voltage.

Alternatively, the control circuit comprises a voltage detecting circuit and a current control circuit, the voltage detecting circuit has two input terminals which are respectively connected to the high potential end and the low potential end of the rectified voltage, the current control circuit receives an output voltage from the voltage detecting circuit, the high potential end of the rectified voltage is connected to a first end of the first light string through a first unilateral conduction element, a second end of the first light string is connected to the reference ground through a first switch module, second ends of the second to $N^{th}$ light strings are connected to second to $N^{th}$ switch modules respectively through second to $N^{th}$ unilateral conduction elements, and the output voltage of the current control circuit is applied to control terminals of the first to $N^{th}$ switch modules;

the voltage detecting circuit determines whether the AC input terminal is connected to the dimmer by detecting the rectified voltage, when the AC input terminal is detected to be connected to the dimmer, the current control circuit controls the $N^{th}$ switch module to be turned on and the first to $(N-1)^{th}$ switch modules to be turned off, when it is detected that the AC input terminal is not connected to the dimmer, the current control circuit controls one of the first to $N^{th}$ switch modules to be turned on and rest of the first to $N^{th}$ switch modules to be turned off in accordance with the output voltage of the voltage detecting circuit.

Alternatively, when the voltage detecting circuit detects that the AC input terminal is not connected to the dimmer, the current control circuit controls a $k^{th}$ switch module of the first to $N^{th}$ switch modules to be turned on and the first to $N^{th}$ switch modules, except the $k^{th}$ switch module, to be turned off in a case that the rectified voltage is within in a $k^{th}$ voltage range, and k is a natural number from 1 to N.

Alternatively, the first to $N^{th}$ switch modules are realized by first to $N^{th}$ MOS transistors, respectively, and the first to $N^{th}$ MOS transistors have gate electrodes functioning as the control terminals of the first to $N^{th}$ switch modules.

Alternatively, the lighting circuit comprises first to $N^{th}$ sampling resistors, a first end of the $N^{th}$ MOS transistor is connected to the reference ground through the $N^{th}$ sampling resistor, first ends of the first to $(N-1)^{th}$ MOS transistors are connected to the first end of the $N^{th}$ MOS transistor respectively through the first to $(N-1)^{th}$ sampling resistors, and the current control circuit receives first-end voltages provided at the first ends of the first to $N^{th}$ MOS transistors, respectively.

Alternatively, when a connection to the dimmer is detected, the current control circuit performs operational amplification on the first-end voltage of the $N^{th}$ MOS transistor and controls a voltage at the gate electrode of the $N^{th}$ MOS transistor in order to make the first-end voltage of the $N^{th}$ MOS transistor close to an $N^{th}$ reference voltage, when no connection to the dimmer is detected, the current control circuit performs operational amplification on the first-end voltages of the first to $N^{th}$ MOS transistors and individually controls voltages at the gate electrodes of the first to $N^{th}$ MOS transistors in accordance with the rectified voltage in order to make the first-end voltages of the first to $N^{th}$ MOS transistors close to first to $N^{th}$ reference voltages, respectively.

According to a second aspect of the present disclosure, there is provided a control method for a lighting circuit, wherein an AC input signal provided by an AC input terminal is rectified to generate a rectified voltage between a high potential end and a low potential end, the low potential end of the rectified voltage is used as a reference ground, a load of the lighting circuit is composed of first to $N^{th}$ light strings connected in series, wherein N is a natural number greater than or equal to 2, when the AC input terminal is detected to be connected to a dimmer, the first to $N^{th}$ light strings are controlled to be simultaneously turned on, when it is detected that the AC input terminal is not connected to the dimmer, the first to $N^{th}$ light strings are individually controlled to be turned on in accordance with the rectified voltage.

Alternatively, the high potential end of the rectified voltage is connected to a first end of the first light string through a first unilateral conduction element, a second end of the first light string is connected to the reference ground through a first switch module, second ends of the second to $N^{th}$ light strings are connected to second to $N^{th}$ switch modules respectively through second to $N^{th}$ unilateral conduction elements;

the rectified voltage is detected to determine whether the AC input terminal is connected to the dimmer, when the AC input terminal is detected to be connected to the dimmer, the $N^{th}$ switch module is controlled to be turned on and the first to $(N-1)^{th}$ switch modules to be turned off, when it is detected that the AC input terminal is not connected to the dimmer, one of the first to $N^{th}$ switch modules is controlled to be turned on and rest of the first to $N^{th}$ switch modules to be turned off.

Alternatively, when it is detected that the AC input terminal is not connected to the dimmer, a $k^{th}$ switch module of the first to $N^{th}$ switch modules is controlled to be turned on and the first to $N^{th}$ switch modules, except the $k^{th}$ switch module, are controlled to be turned off in a case that the rectified voltage is within in a $k^{th}$ voltage range, and k is a natural number from 1 to N.

Alternatively, the first to $N^{th}$ switch modules are realized by first to $N^{th}$ MOS transistors, and the first to $N^{th}$ MOS transistors have gate electrodes functioning as the control terminals of the first to $N^{th}$ switch modules.

Alternatively, the lighting circuit comprises first to $N^{th}$ sampling resistors, a first end of the $N^{th}$ MOS transistor is connected to the reference ground through the $N^{th}$ sampling resistor, first ends of the first to $(N-1)^{th}$ MOS transistors are connected to the first end of the $N^{th}$ MOS transistor respectively through the first to $(N-1)^{th}$ sampling resistors, and a current control circuit receives first-end voltages provided at the first ends of the first to $N^{th}$ MOS transistors, respectively.

Alternatively, when a connection to the dimmer is detected, operational amplification is performed on the first-end voltage of the $N^{th}$ MOS transistor and a voltage at the gate electrode of the $N^{th}$ MOS transistor is controlled to make the first-end voltage of the $N^{th}$ MOS transistor close to an $N^{th}$ reference voltage, when no connection to the dimmer is detected, operational amplification is performed on the first-end voltages of the first to $N^{th}$ MOS transistors and voltages at the gate electrodes of the first to $N^{th}$ MOS transistors are individually controlled to make the first-end voltages of the first to $N^{th}$ MOS transistors close to first to $N^{th}$ reference voltages, respectively.

According to a third aspect of the present disclosure, there is also provided a lighting circuit.

Compared with the prior art, the circuit and method according to embodiments of the present disclosure have advantages to obtain a high power factor and a good compatibility with a dimmer, and to be easily implemented by a simple scheme.

BRIEF DESCRIPTION OF THE DRAWINGS

In order to explain the technical solutions according to the embodiments of the present disclosure more clearly, drawings of the embodiments will be briefly described in the following description. Obviously, the drawings in the following description only relate to some embodiments of the present disclosure, and are not intended to limit the disclosure.

DETAILED DESCRIPTION OF THE DISCLOSURE

The preferred embodiments of the present disclosure are described in detail below with reference to the drawings, but the disclosure is not limited to the embodiments. The present disclosure includes all alternatives, modifications, equivalent methods and schemes within the spirit and scope of the disclosure.

In order to provide the public with a thorough understanding of the disclosure, specific details are described in the following preferred embodiments of the present disclosure, however, those skilled in the art will fully understand the disclosure even without the description of the details.

The disclosure is more specifically described in the following paragraphs by way of example with reference to the accompanying drawings. It should be noted that the drawings are in a simplified form and both use non-precise proportions, and they are merely used to conveniently and clearly assist to describe the purpose of the embodiments of the present disclosure.

According to the present disclosure, there is provided a control circuit for a lighting circuit, wherein an AC input signal provided by an AC input terminal is rectified to obtain a rectified voltage VREC between a high potential end and a low potential end, the low potential end of the rectified voltage VREC is used as a reference ground, a load of the lighting circuit is composed of first to $N^{th}$ light strings connected in series, wherein N is a natural number greater than or equal to 2. When the control circuit detects that the AC input terminal is connected to a dimmer, the control circuit controls the first to $N^{th}$ light strings to be simultaneously turned on. When the control circuit detects that the AC input terminal is not connected to the dimmer, the control circuit individually controls the first to $N^{th}$ light strings to be turned on in accordance with the rectified voltage VREC. That is, when the rectified voltage VREC is within different voltage ranges, different light strings are turned on. In some embodiments, when the rectified voltage is high, a large number of the light strings are turned on, and when the rectified voltage is low, a small number of the light strings are turned on.

According to the present disclosure, the lighting circuit can obtain a high power factor and is compatible with the dimmer, and the scheme is simple and easy to implement.

Figure 1:
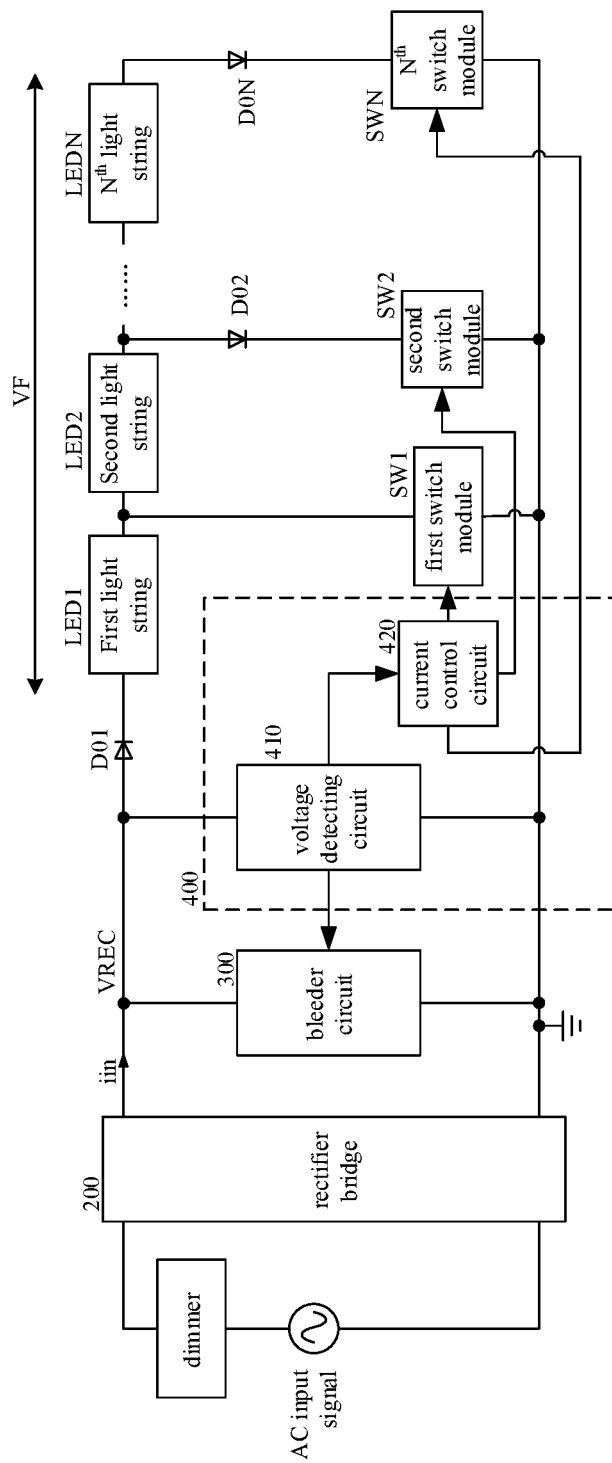
FIG. 1 is a block diagram showing an exemplary implementation of a lighting circuit and a control circuit for the lighting circuit according to the present disclosure.

Referring to FIG. 1, a control circuit 400 for the lighting circuit comprises a voltage detecting circuit 410 and a current control circuit 420, the voltage detecting circuit 410 has two input terminals which are respectively connected to the high potential end and the low potential end of the rectified voltage VREC, the current control circuit 420 receives an output voltage from the voltage detecting circuit 410, the high potential end of the rectified voltage VREC is connected to a first end of the first light string LED1 through a unilateral conduction element D01, a second end of the first light string LED1 is connected to the reference ground through a first switch module SW1, second ends of the second light string LED2 to the $N^{th}$ light string LEDN are connected to a second switch module SW2 to an $N^{th}$ switch module SWN respectively through a second unilateral conduction element D02 to an $N^{th}$ unilateral conduction element D0N, an output voltage of the current control circuit 420 is applied to control terminals of the first switch module SW1 to the $N^{th}$ switch module SWN, a second end of an $m^{th}$ light string LEDm is connected to a first end of an $(m+1)^{th}$ light string LED (m+1), wherein m is a natural number from 1 to (N−1). The voltage detecting circuit 410 determines whether the AC input terminal is connected to a dimmer by detecting the rectified voltage VREC, the current control circuit 410 controls the $N^{th}$ switch module SWN to be turned on and controls the first to $(N-1)^{th}$ switch modules SW1 to SW (N−1) to be turned off when a connection to the dimmer is detected, and when no connection to the dimmer is detected, the current control circuit controls one of the first switch module SW1 to the $N^{th}$ switch module SWN to be turned on and the rest of the switch modules to be turned off in accordance with the output voltage of the voltage detecting circuit.

As an embodiment, when the voltage detecting circuit 410 detects that no dimmer is connected, the current control circuit 420 controls a $k^{th}$ switch module SWk to be turned on and controls the rest of the switch modules to be turned off in a case that the rectified voltage VREC is within a $k^{th}$ voltage range, and k is a natural number from 1 to N.

Figure 2:
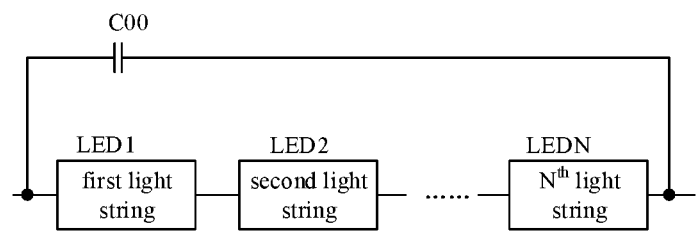
FIG. 2(a) shows a capacitive connection manner according to an embodiment of the present disclosure.
FIG. 2(b) shows a capacitive connection manner according to another embodiment of the present disclosure.
Figure 2:
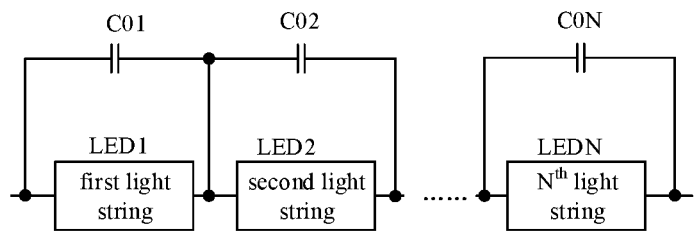

Referring to FIG. 2(a), two ends of the capacitor C00 are respectively connected to the first end of the first light string and the second end of the $N^{th}$ light string. The capacitor C00 is used for decreasing load ripples.

Referring to FIG. 2(b), showing capacitive connection manner in another embodiment, the capacitors C01~C0N are connected in parallel with the first light string LED1 to the $N^{th}$ light string LEDN, respectively.

As an embodiment, the first to $N^{th}$ switch modules are realized by a first to $N^{th}$ MOS transistors, and gate electrodes of the first to $N^{th}$ MOS transistor function as control terminals of the first to $N^{th}$ switch modules. Each MOS transistor can be either an NMOS transistor or a PMOS transistor. Realizing the switch modules by NMOS transistors is taken as an example for explanation. Source electrode and drain electrode of each NMOS transistor serve as a first end and a second end of the MOS transistor, respectively.

Figure 3:
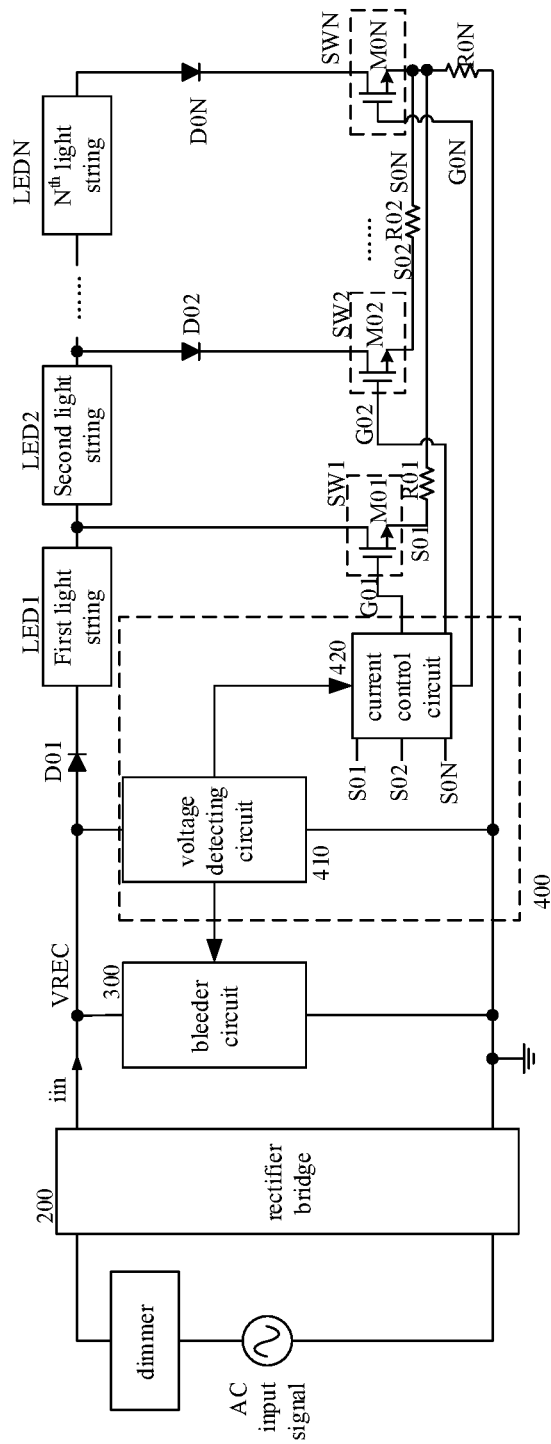
FIG. 3 shows a lighting circuit and a control circuit for the lighting circuit according to an embodiment of the present disclosure.

Referring to FIG. 3, the first switch module SW1 to the $N^{th}$ switch module SWN are realized by the first NMOS transistor to the $N^{th}$ NMOS transistor, and the gate electrodes of the first to $N^{th}$ NMOS transistors are the control terminals of the first switch module SW1 to the $N^{th}$ switch module SWN.

Referring to FIG. 3 again, the lighting circuit comprises first to $N^{th}$ sampling resistors, the source electrode of the $N^{th}$ NMOS transistor is connected to the reference ground through the $N^{th}$ sampling resistor R0N, the source electrodes of the first to $(N-1)^{th}$ NMOS transistors are connected to the source electrode of the $N^{th}$ NMOS transistor respectively through the first sampling resistor R01 to the $(N-1)^{th}$ sampling resistor R0 (N−1), and the current control circuit 420 receives voltages at the source electrodes of the first to $N^{th}$ NMOS transistors.

Figure 4:
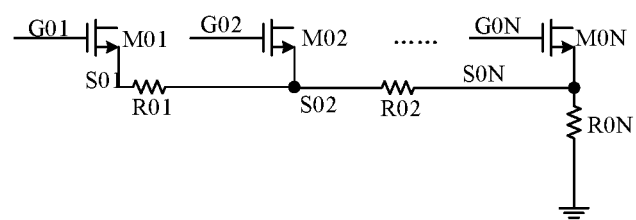
FIG. 4 is a circuit diagram including sampling resistors according to an embodiment of the present disclosure.

Referring to FIG. 4, showing a different connection manner of the sampling resistors, the source electrode of the $N^{th}$ NMOS is connected to the reference ground through the $N^{th}$ sampling resistor R0N, and the source electrode of an $m^{th}$ NMOS transistor is connected to the source electrode of an $(m+1)^{th}$ NMOS transistor through an $m^{th}$ sampling resistor R0m, and the current control circuit 420 receives the voltages S01 to S0N at the source electrodes of the first to $N^{th}$ NMOS transistors, wherein m is a natural number from 1 to (N−1).

Figure 5:
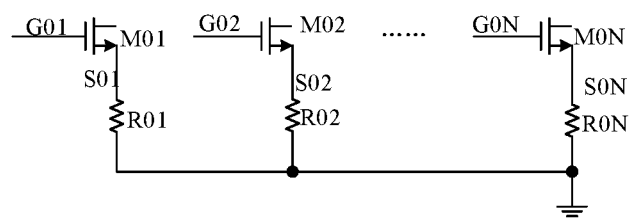
FIG. 5 is a circuit diagram including sampling resistors according to another embodiment of the present disclosure.

Referring to FIG. 5, showing a different connection manner of the sampling resistors, the source electrodes of the first to $N^{th}$ NMOS are connected to the reference ground respectively through the first sampling resistor R01 to the $N^{th}$ sampling resistor R0N, and the current control circuit 420 receives the voltages S01 to S0N at the source electrodes of the first to $N^{th}$ NMOS transistors.

When the connection to the dimmer is detected, the current control circuit 420 performs operational amplification on the voltage S0N at the source electrode of the $N^{th}$ NMOS transistor and controls the voltage G0N at the gate electrode of the $N^{th}$ NMOS transistor so that the voltage S0N at the source electrode of the $N^{th}$ NMOS transistor is close to an $N^{th}$ reference voltage. When no connection to the dimmer is detected, according to the amplitude of the rectified voltage VREC, the current control circuit 420 performs operational amplification on the voltages S01 to S0N at the source electrodes of the first to $N^{th}$ NMOS transistors and controls the voltages G01 to G0N at the gate electrodes of the first to $N^{th}$ NMOS transistors so that the voltages S01 to S0N at the source electrodes of the first to $N^{th}$ MOS transistors are close to the first to $N^{th}$ reference voltages.

Figure 6:
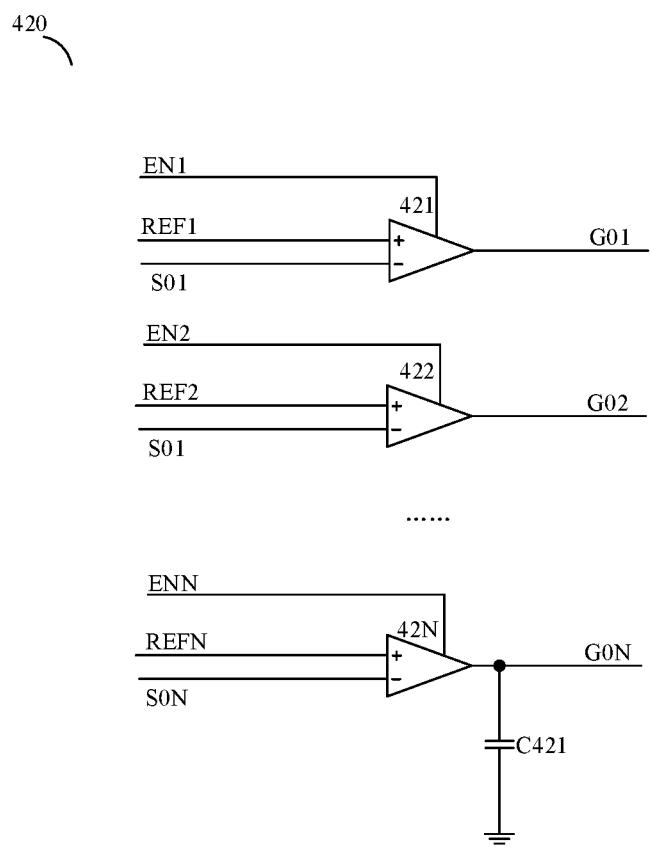
FIG. 6 shows an implementation of a current control circuit 420 according to an embodiment of the present disclosure.

Referring to FIG. 6, showing an implementation of the current control circuit 420, the voltages S01 to S0N at the source electrodes of the first to $N^{th}$ NMOS transistors are respectively applied to negative input terminals of operational amplifier circuits 421 to 42N, and the first reference voltage REF1 to the $N^{th}$ reference voltage REFN are respectively applied to positive input terminals of the operational amplifier circuits 421 to 42N, and the voltage detection circuit 410 outputs enable signals EN1 to ENN which are respectively provided to enable terminals of the operational amplifier circuits 421 to 42N, and the output terminals of the operational amplifier circuits 421 to 42N are configured to receive the voltages G01 to G0N at the gate electrode of the first to $N^{th}$ NMOS transistors. The output terminal of the operational amplifier 42N is connected to the reference ground through a capacitor C421.

Figure 7:
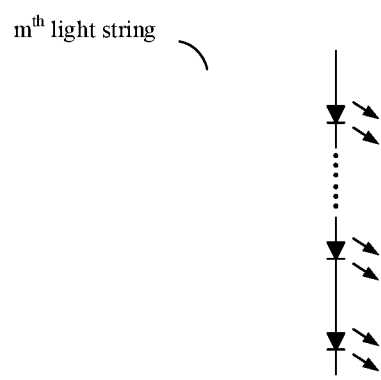
FIG. 7 shows an implementation of a light string according to an embodiment of the present disclosure.

Referring to FIG. 7, the $m^{th}$ light string is realized by a plurality of LEDs being connected in series. The numbers of LEDs in different light strings can be different.

In order to be compatible with the dimmer, the lighting circuit further includes a bleeder circuit 300. Both of two ends of the bleeder circuit 300 are respectively connected to the high potential end and the low potential end of the rectified voltage, and the bleeder circuit is controlled in accordance with the output voltage of the voltage detecting circuit 410.

Figure 8:
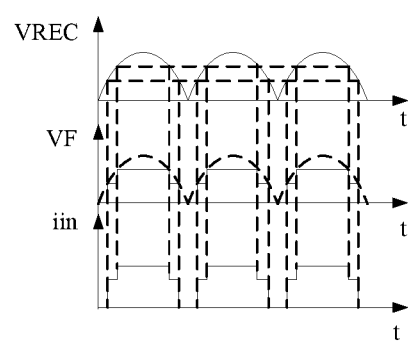
FIG. 8 shows waveform diagrams of a rectified voltage VREC, a voltage VF across first to $N^{th}$ light strings, and an input current in when an input terminal is not connected to a dimmer.
Figure 9:
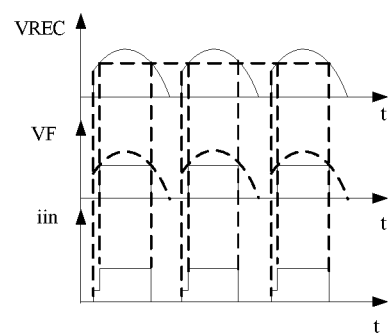
FIG. 9 shows waveform diagrams of a rectified voltage VREC, a voltage VF across first to $N^{th}$ light strings, and an input current in when an input terminal is connected to a dimmer with a large dimming angle.
Figure 10:
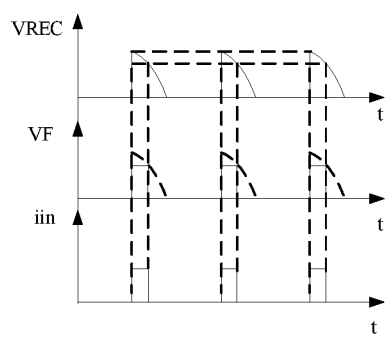
FIG. 10 shows waveform diagrams of a rectified voltage VREC, a voltage VF across first to $N^{th}$ strings, and an input current in when an input terminal is connected to a dimmer with a small dimming angle.

In a case that N=2, FIG. 8 shows waveform diagrams of the rectified voltage VREC, a voltage VF across the first to $N^{th}$ light strings, and an input current in when the AC input terminal is not connected to the dimmer; FIG. 9 shows waveform diagrams of the rectified voltage VREC, the voltage VF across the first to $N^{th}$ light strings, and the input current in when the AC input terminal is connected to the dimmer with a large dimming angle; FIG. 10 shows waveform diagrams of the rectified voltage VREC, the voltage VF across the first to $N^{th}$ light strings, and the input current in when the AC input terminal is connected to a dimmer with a small dimming angle. When the voltage detecting circuit 410 detects that the AC input terminal is not connected to the dimmer, the bleeder circuit 300 is controlled not to generate a bleeder current. When the voltage detecting circuit 410 detects that the AC input terminal is connected to the dimmer, the bleeder circuit 300 is controlled to generate a bleeder current to maintain the dimmer in a turn-on state.

The present disclosure provides a lighting circuit including the above described control circuit 400.

The present disclosure also provides a control method for the lighting circuit, an AC input signal provided by an AC input terminal is rectified to obtain a rectified voltage between a high potential end and a low potential end, the low potential end of the rectified voltage is used as a reference ground, a load of the lighting circuit is composed of first to $N^{th}$ light strings connected in series, wherein N is a natural number greater than or equal to 2. When the AC input terminal is detected to be connected to a dimmer, the N light strings are controlled to be simultaneously turned on, and when it is detected that the AC input terminal is not connected to the dimmer, the N light strings are individually controlled to be turned on in accordance with the rectified voltage.

The high potential end of the rectified voltage is connected to a first end of the first light string through a first unilateral conduction element, a second end of the first light string is connected to the reference ground through a first switch module, second ends of second to $N^{th}$ light strings are respectively connected to second to $N^{th}$ switch modules through second to $N^{th}$ unilateral conduction elements; whether the AC input terminal is connected to the dimmer is determined by detecting the rectified voltage, when the AC input terminal is detected to be connected to the dimmer, the $N^{th}$ switch module is controlled to be turned on and the first to $(N-1)^{th}$ switch modules to be turned off; when it is detected that the AC input terminal is not connected to the dimmer, one of the first to $N^{th}$ switch modules is controlled to be turned on and the rest of the switch modules to be turned off in accordance with the output voltage of the voltage detecting circuit.

When no connection to the dimmer is detected, a $k^{th}$ switch module of the N switch modules is controlled to be turned on and each one of the rest of the N switch modules is controlled to be turned off in a case that the rectified voltage is within in a $k^{th}$ voltage range, and k is a natural number from 1 to N.

The first to $N^{th}$ switch modules are realized by the first to $N^{th}$ MOS transistors, and the gate electrodes of the first to $N^{th}$ MOS transistors function as control terminals of the first to $N^{th}$ switch modules.

The lighting circuit comprises first to $N^{th}$ sampling resistors, a first end of the $N^{th}$ MOS transistor is connected to the reference ground through the $N^{th}$ sampling resistor, first ends of the first to $(N-1)^{th}$ MOS transistors are connected to the first end of the $N^{th}$ MOS transistor respectively through the first to $(N-1)^{th}$ sampling resistors, and a current control circuit receives first-end voltages at the first ends of the first to $N^{th}$ MOS transistors.

When a connection to the dimmer is detected, operational amplification is performed on the first-end voltage of the $N^{th}$ MOS transistor and a voltage at the gate electrode of the $N^{th}$ MOS transistor is controlled so that the first-end voltage of the $N^{th}$ MOS transistor is close to a $N^{th}$ reference voltage; when no connection to the dimmer is detected, operational amplification is performed on the first-end voltages of the first to $N^{th}$ MOS transistors and voltages at the gate electrodes of the first to $N^{th}$ MOS transistors are controlled individually so that the first-end voltages of the first to $N^{th}$ MOS transistors are close to the first to $N^{th}$ reference voltages.

In addition, although the embodiments are separately illustrated and described the above embodiments, they include a part of common technology, and it will be apparent to those skilled in the art that substitution and integration may be made between the embodiments, and the content that is not explicitly described in one embodiment can refer to another embodiment including this content.

The preferred embodiments of the present invention are described in the above paragraphs, but not construed as limiting the present invention. Many modifications, equivalence, variations of the preferred embodiments can be made without departing from the doctrine and spirit of the present disclosure.

The invention claimed is:

1. A control circuit for a lighting circuit, comprising a voltage detecting circuit and a current control circuit, wherein an AC input signal provided by an AC input terminal of the lighting circuit is rectified to obtain a rectified voltage between a high potential end and a low potential end, the low potential end of the rectified voltage is used as a reference ground, a load of the lighting circuit is composed of first to $N^{th}$ light strings connected in series, and N is a natural number greater than or equal to 2, wherein the voltage detecting circuit has two input terminals which are respectively connected to the high potential end and the low potential end of the rectified voltage, the current control circuit receives an output voltage from the voltage detecting circuit, the high potential end of the rectified voltage is connected to a first end of the first light string through a first unilateral conduction element, a second end of the first light string is connected to the reference ground through a first switch module, second ends of the second to the $N^{th}$ light strings are respectively connected to second to the $N^{th}$ switch modules through second to $N^{th}$ unilateral conduction elements, and an output voltage of the current control circuit is applied to control terminals of the first to the $N^{th}$ switch modules;

wherein the voltage detecting circuit determines whether the AC input terminal is connected to a dimmer that is detected by detecting the rectified voltage, when a connection of the AC input terminal is detected to be connected to the dimmer, the current control circuit controls the $N^{th}$ switch module to be turned on and the first to the $(N-1)^{th}$ switch modules to be turned off, so that the first to the $N^{th}$ light strings are simultaneously turned on, and when it is detected that the AC input terminal is not connected to the dimmer, the current control circuit controls one of the first to the $N^{th}$ switch modules to be turned on and the rest of the first to the $N^{th}$ switch modules to be turned off in accordance with the output voltage of the voltage detecting circuit, so that the first to the $N^{th}$ light strings are individually controlled to be turned on in accordance with the rectified voltage.

2. The control circuit according to claim 1, wherein when the voltage detecting circuit detects that the AC input terminal is not connected to the dimmer, the current control circuit controls a $k^{th}$ switch module of the first to the $N^{th}$ switch module to be turned on and rest of the first to the $N^{th}$ switch module to be turned off in a case that the rectified voltage is within in a $k^{th}$ voltage range, and k is a natural number from 1 to N.

3. The control circuit according to claim 1, wherein the first to the $N^{th}$ switch modules are realized by first to $N^{th}$ MOS transistors, and the first to the $N^{th}$ MOS transistors have gate electrodes functioning as the control terminals of the first to the $N^{th}$ switch modules.

4. The control circuit according to claim 3, wherein the lighting circuit further comprises first to $N^{th}$ sampling resistors, a first end of the $N^{th}$ MOS transistor is connected to the reference ground through the $N^{th}$ sampling resistor, first ends of the first to the $(N-1)^{th}$ MOS transistors are connected to the first end of the $N^{th}$ MOS transistor respectively through the first to the $(N-1)^{th}$ sampling resistors, and the current control circuit receives first-end voltages provided by the first ends of the first to the $N^{th}$ MOS transistors.

5. The control circuit according to claim 4, wherein when a connection to the dimmer is detected, the current control circuit performs operational amplification on the first-end voltage of the $N^{th}$ MOS transistor and controls a voltage at the gate electrode of the $N^{th}$ MOS transistor so that the first-end voltage of the $N^{th}$ MOS transistor is close to an $N^{th}$ reference voltage, when no connection to the dimmer is detected, the current control circuit performs operational amplification on the first-end voltages of the first to the $N^{th}$ MOS transistors and individually controls voltages at the gate electrodes of the first to the $N^{th}$ MOS transistors in accordance with the rectified voltage so that the first-end voltages of the first to the $N^{th}$ MOS transistors are close to a first reference voltage to the $N^{th}$ reference voltage, respectively.

6. A lighting control method comprising providing a lighting circuit, wherein an AC input signal provided by an AC input terminal thereof is rectified to obtain a rectified voltage between a high potential end and a low potential end, the low potential end of the rectified voltage is used as a reference ground, a load of the lighting circuit is composed of first to $N^{th}$ light strings connected in series, wherein N is a natural number greater than or equal to 2, wherein the high potential end of the rectified voltage is connected to a first end of the first light string through a first unilateral conduction element, a second end of the first light string is connected to the reference ground through a first switch module, second ends of the second to the $N^{th}$ light strings are connected to second to $N^{th}$ switch modules respectively through second to $N^{th}$ unilateral conduction elements;

wherein whether the AC input terminal is connected to a dimmer or not that is determined by detecting the rectified voltage, when it is detected that the AC input terminal is connected to the dimmer, controlling and turning on the $N^{th}$ switch module and turning off the first to the $(N-1)^{th}$ switch modules, so that the first to the $N^{th}$ light strings are simultaneously turned on; and when it is detected that the AC input terminal is not connected to the dimmer, controlling and turning on one of the first to the $N^{th}$ switch modules and turning off the rest of the first to the $N^{th}$ switch modules, so that the first to the $N^{th}$ light strings are individually controlled to be turned on in accordance with the rectified voltage.

7. The control method according to claim 6, wherein when it is detected that the AC input terminal is not connected to the dimmer, a $k^{th}$ switch module of the N switch modules is controlled to be turned on and each one of the rest of the N switch modules is controlled to be turned off in a case that the rectified voltage is within in a $k^{th}$ voltage range, and k is a natural number from 1 to N.

8. The control method according to claim 6, wherein the first to the $N^{th}$ switch modules are realized by first to the $N^{th}$ MOS transistors, and the first to the $N^{th}$ MOS transistors have gate electrodes functioning as control terminals of the first to the $N^{th}$ switch modules.

9. The control method according to claim 8, wherein the lighting circuit further comprises first to $N^{th}$ sampling resistors, a first end of the $N^{th}$ MOS transistor is connected to the reference ground through the $N^{th}$ sampling resistor, first ends of the first to the $(N-1)^{th}$ MOS transistors are connected to the first end of the $N^{th}$ MOS transistor respectively through the first to the $(N-1)^{th}$ sampling resistors, and a current control circuit receives first-end voltages at the first ends of the first to the $N^{th}$ MOS transistors.

10. The control method according to claim 9, wherein when a connection to the dimmer is detected, operational amplification is performed on the first-end voltage of the $N^{th}$ MOS transistor and a voltage at the gate electrode of the $N^{th}$ MOS transistor is controlled so that the first-end voltage of the $N^{th}$ MOS transistor is close to an $N^{th}$ reference voltage, when no connection to the dimmer is detected, operational amplification is performed on the first-end voltages of the first to the $N^{th}$ MOS transistors and voltages at the gate electrodes of the first to the $N^{th}$ MOS transistors are individually controlled so that the first-end voltages of the first to the $N^{th}$ MOS transistors are close to a first reference voltage to the $N^{th}$ reference voltage, respectively.

* * * * *